US008705196B2

(12) United States Patent
Livshitz et al.

(10) Patent No.: US 8,705,196 B2
(45) Date of Patent: Apr. 22, 2014

(54) STORAGE DEVICE HAVING DEGAUSS CIRCUITRY WITH SEPARATE CONTROL OF DEGAUSS SIGNAL STEADY STATE AND OVERSHOOT PORTIONS

(75) Inventors: Boris Livshitz, Eagan, MN (US); Anamul Hoque, Lakeville, MN (US); Jason S. Goldberg, Saint Paul, MN (US)

(73) Assignee: LSI Corporation, San Jose, CA (US)

( * ) Notice: Subject to any disclaimer, the term of this patent is extended or adjusted under 35 U.S.C. 154(b) by 87 days.

(21) Appl. No.: 13/447,741

(22) Filed: Apr. 16, 2012

(65) Prior Publication Data

US 2013/0271867 A1 Oct. 17, 2013

(51) Int. Cl.
G11B 5/02 (2006.01)
(52) U.S. Cl.
USPC .................... 360/67; 360/68; 360/46; 360/55
(58) Field of Classification Search
None
See application file for complete search history.

(56) References Cited

U.S. PATENT DOCUMENTS

| 7,372,653 | B2 | 5/2008 | Suzuki et al. |
| 7,787,211 | B2 | 8/2010 | Kim et al. |
| 7,813,068 | B2 | 10/2010 | Takeuchi |
| 7,872,825 | B2 | 1/2011 | Sanghvi |
| 2005/0190476 | A1 | 9/2005 | Wilson et al. |
| 2005/0243457 | A1 | 11/2005 | Akamatsu et al. |
| 2006/0139787 | A1 | 6/2006 | Ohinata et al. |
| 2006/0176597 | A1 | 8/2006 | Ngo et al. |
| 2007/0153410 | A1 | 7/2007 | Hashizume et al. |
| 2008/0316669 | A1 | 12/2008 | May |
| 2012/0105992 | A1* | 5/2012 | Dina et al. ...................... 360/27 |

OTHER PUBLICATIONS

M.S. Patwari et al., "Simulation of Erase After Write on 2.4T FeCo Solid Pole Writer," IEEE Transactions on Magnetics, May 2010, pp. 1212-1219, vol. 46, No. 5.
M.E. Schabes et al., "Dynamic Micromagnetic Studies of Anisotropy Effects in Perpendicular Write Heads," IEEE Transactions on Magnetics, Oct. 2005, pp. 3073-3075, vol. 41, No. 10.
D.Z. Bai et al., "Degaussing PMR Writer Poles: A Micromagnetic Modeling Study," IEEE Transactions on Magnetics, Oct. 2011, pp. 3407-3410, vol. 47, No. 10.
J.J. Kim et al., "Magnetic Domain Observation in Writer Pole Tip for Perpendicular Recording Head by Electron Holography," Applied Physics Letters, Magnetism and Superconductivity, Apr. 2008, 3 pages, vol. 92, No. 16.
B. Livshitz et al., "Degaussing of Write Heads in Perpendicular Magnetic Recording," IEEE Transactions on Magnetics, Oct. 2011, pp. 3403-3406, vol. 47, No. 10.

(Continued)

*Primary Examiner* — Muhammad N Edun
(74) *Attorney, Agent, or Firm* — Ryan, Mason & Lewis, LLP

(57) ABSTRACT

A hard disk drive or other disk-based storage device comprises a storage disk, a write head configured to write data to the disk, and control circuitry coupled to the write head. The control circuitry comprises a write driver and degauss circuitry associated with the write driver. The degauss circuitry is configured to control a degauss signal waveform to be applied to the write head by the write driver, and comprises separate amplitude envelope control mechanisms for steady state and overshoot portions of the degauss signal waveform. The separate amplitude envelope control mechanisms may comprise, for example, separate steady state and overshoot controllers for controlling the amplitude envelope decay rates of the respective steady state and overshoot portions of the degauss signal waveform over the plurality of pulses.

20 Claims, 12 Drawing Sheets

(56) References Cited

OTHER PUBLICATIONS

H.J. Richter et al., "Unlocking of Remanent Magnetization of Pole Heads by "Rumble Strips"," IEEE Transactions on Magnetics, Oct. 2005, pp. 3061-3063, vol. 41, No. 10.

H.J. Richter et al., "Unlocking of Remanent Magnetization of Pole Heads by Medium Stray Fields," Applied Physics Letter, 2005, pp. 152508, vol. 86.

U.S. Appl. No. 13/186,445 filed in the name of J.S. Goldberg et al. on Jul. 19, 2011 and entitled "Magnetic Storage Device with Chirped Write Head Degaussing Waveform."

* cited by examiner

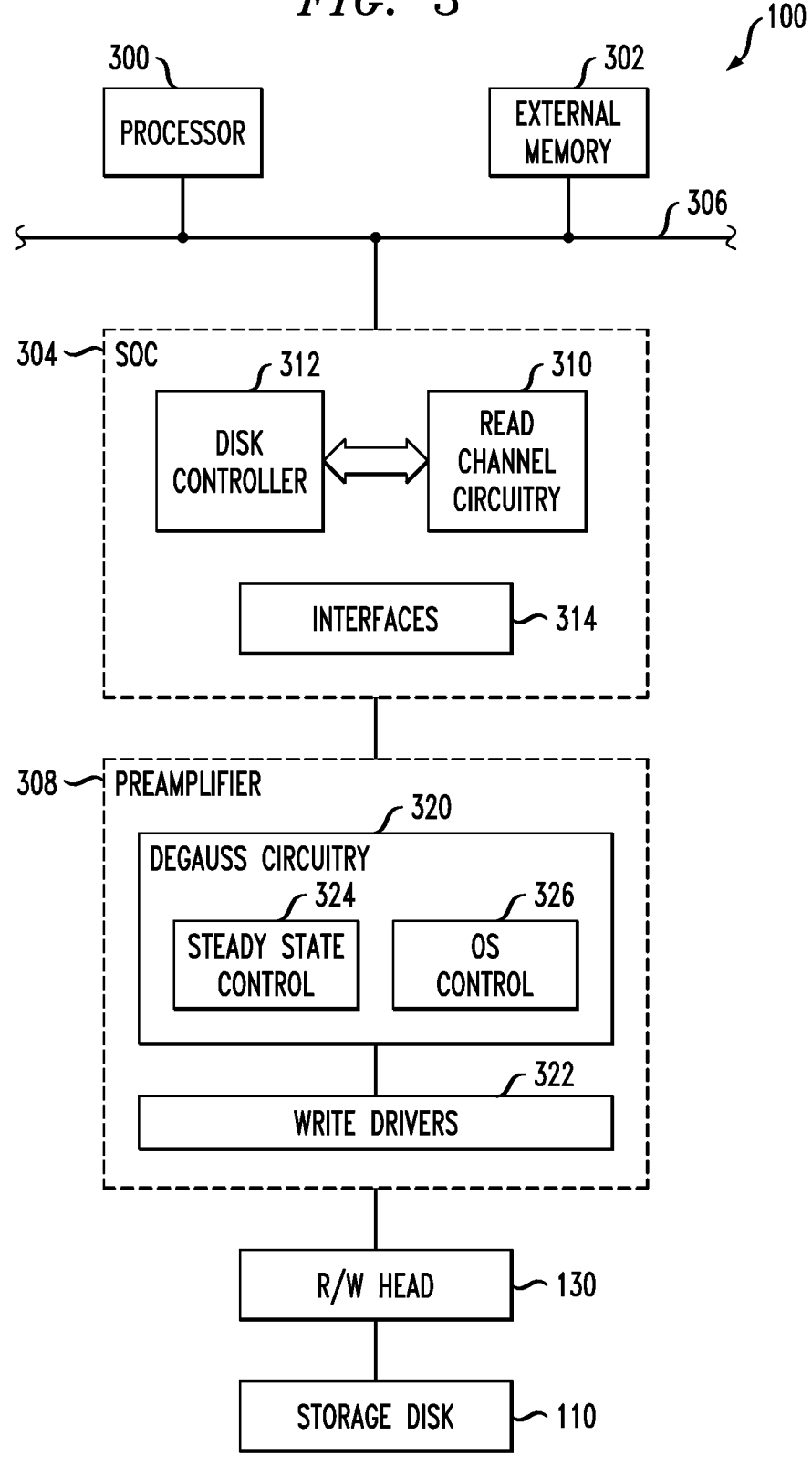

STORAGE DEVICE HAVING DEGAUSS CIRCUITRY WITH SEPARATE CONTROL OF DEGAUSS SIGNAL STEADY STATE AND OVERSHOOT PORTIONS

BACKGROUND

Disk-based storage devices such as hard disk drives (HDDs) are used to provide non-volatile data storage in a wide variety of different types of data processing systems. A typical HDD comprises a spindle which holds one or more flat circular storage disks, also referred to as platters. Each storage disk comprises a substrate made from a non-magnetic material, such as aluminum or glass, which is coated with one or more thin layers of magnetic material. In operation, data is read from and written to tracks of the storage disk via a read/write head that is moved precisely across the disk surface by a positioning arm as the disk spins at high speed.

The storage capacity of HDDs continues to increase, and HDDs that can store multiple terabytes (TB) of data are currently available. However, increasing the storage capacity often involves shrinking track dimensions, bit lengths or other features in order to fit more data onto each storage disk, which can lead to a variety of problems, including degraded on-track recording performance, as well as off-track recording performance issues such as adjacent track erasure.

A number of techniques have been developed in an attempt to further increase storage capacity. For example, a technique known as shingled magnetic recording (SMR) attempts to increase storage capacity of an HDD by "shingling" a given track over a previously written adjacent track on a storage disk. In another technique, referred to as bit-patterned media (BPM), high density tracks of magnetic islands are preformed on the surface of the storage disk, and bits of data are written to respective ones of these islands. Other techniques include, for example, heat-assisted magnetic recording (HAMR) and microwave-assisted magnetic recording (MAMR). The HAMR technique utilizes a laser to locally preheat an area on the disk surface prior to recording in that area. In the MAMR technique, an additional write head is configured to emit an AC magnetic field that excites ferromagnetic resonance in the media, building up energy that eases the process of writing data.

HDDs often include a system-on-chip (SOC) to process data from a computer or other processing device into a suitable form to be written to the storage disk, and to transform signal waveforms read back from the storage disk into data for delivery to the computer. The SOC has extensive digital circuitry and has typically utilized advanced complementary metal-oxide-semiconductor (CMOS) technologies to meet cost and performance objectives. The HDD also generally includes a preamplifier that interfaces the SOC to the read/write head used to read data from and write data to the storage disk. As is well known, the read/write head may comprise, for example, separate read and write heads.

The preamplifier generally comprises one or more write drivers that provide corresponding write signals to the write head in order to write data to the storage disk. Such write signals are generally characterized as current signals, but may alternatively be characterized as voltage signals. Data bits are usually each stored as group of media grains oriented in a common magnetization direction (e.g., up or down). In order to record a given data bit, the write driver generates a write signal that transitions from a negative write current to a positive write current, or vice-versa, where the magnitude of the write current from zero to its peak value may be in the range of about 15 to 65 milliamperes (mA), although different values can be used.

At the completion of a given write operation, the write head may exhibit remanent magnetization after the write current has been turned off. This residual magnetization or "domain lock up" can be the cause of a phenomenon known as erase after write (EAW), where a non-energized (i.e., zero write current) head is seen to erase or degrade previously-written areas of the disk. These previously-written areas may comprise user data or even fixed servo sectors that are used to control the tracking of the radial position of the write head. In order to address the EAW problem, a degauss signal may be applied to the write head by the preamplifier immediately after completion of the write operation.

The typical degauss signal waveform includes current pulses that repeat at a fixed frequency and decay in steady state amplitude over time. The waveform may include overshoot on each pulse, but in this case the steady state and overshoot portions of the waveform decay at substantially the same rate. Thus, the ratio between the steady state and overshoot portions is kept substantially constant for the duration of the degauss signal.

SUMMARY

Illustrative embodiments of the invention provide HDDs or other types of disk-based storage devices that exhibit enhanced operating performance by generating a degauss signal waveform in which amplitude envelopes of respective steady state and overshoot portions of the waveform can be separately controlled. For example, a steady state amplitude envelope decay rate time constant of the degauss signal waveform may be decoupled from an overshoot amplitude envelope decay rate time constant of the degauss signal waveform, such that the amplitude envelope of the overshoot portion of the degauss signal waveform may be made to decay faster than the amplitude envelope of the steady state portion of that waveform.

In one embodiment, an HDD or other disk-based storage device comprises a storage disk, a write head configured to write data to the disk, and control circuitry coupled to the write head. The control circuitry comprises at least one write driver and degauss circuitry associated with the write driver. The degauss circuitry is configured to control a degauss signal waveform to be applied to the write head by the write driver, and comprises separate amplitude envelope control mechanisms for steady state and overshoot portions of the degauss signal waveform. The separate amplitude envelope control mechanisms may comprise, for example, separate steady state and overshoot controllers for controlling the amplitude envelope decay rates of the respective steady state and overshoot portions of the degauss signal waveform over the plurality of pulses.

A wide variety of different types of amplitude envelopes may be used for the overshoot portion of the degauss signal waveform, independently of the amplitude envelope selected for the steady state portion of the degauss signal waveform. Examples include an overshoot amplitude envelope in which start of the overshoot portion is delayed relative to start of the steady state portion, an overshoot amplitude envelope in which the overshoot portion is held at a constant level for at least a subset of the plurality of pulses, or an overshoot amplitude envelope in which the overshoot portion is subject to a specified type of modulation for at least a subset of the plurality of pulses. Numerous other amplitude envelope shapes may be used for the overshoot portion of the degauss signal waveform, including linear, exponential or arbitrary shapes, and may be selected independently of the amplitude envelope shape used for the steady state portion of the degauss signal waveform.

One or more of the embodiments of the invention provide significant improvements in disk-based storage devices. For example, by providing a degauss signal waveform in which amplitude envelopes of steady state and overshoot portions of the waveform can be separately selected or otherwise controlled, improved write head demagnetization is achieved after each of a plurality of write operations in which data is written to the storage disk, leading to improved recording performance for respective subsequent write operations.

BRIEF DESCRIPTION OF THE DRAWINGS

FIG. 3 is a block diagram of a portion of the storage device of FIG. 1 including a preamplifier comprising one or more write drivers and associated degauss circuitry.

DETAILED DESCRIPTION

Embodiments of the invention will be illustrated herein in conjunction with exemplary disk-based storage devices, write drivers and associated degauss circuitry with separate control of steady state and overshoot portions of a degauss signal waveform. It should be understood, however, that these and other embodiments of the invention are more generally applicable to any storage device in which improved head demagnetization and operating performance are desired. Additional embodiments may be implemented using components other than those specifically shown and described in conjunction with the illustrative embodiments.

Figure 1:
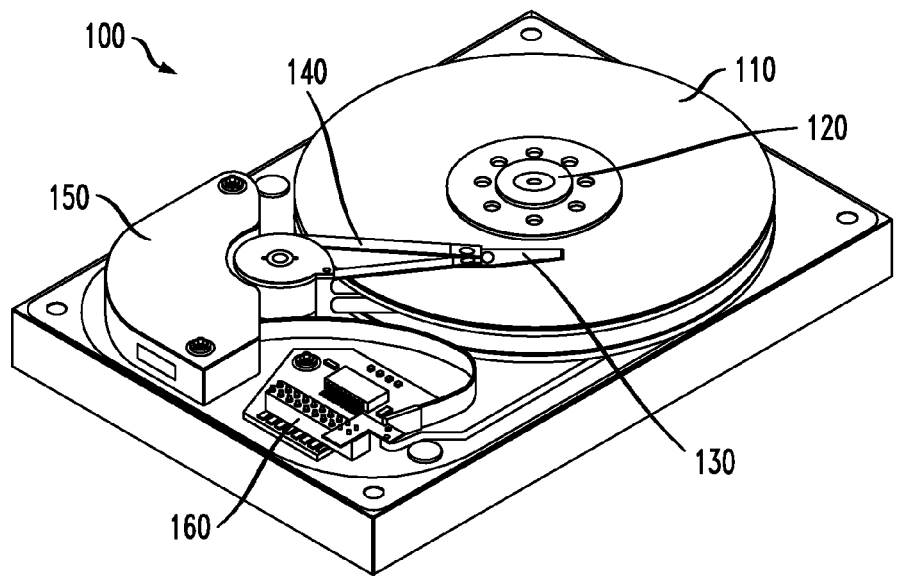
FIG. 1 shows a perspective view of a disk-based storage device in accordance with an illustrative embodiment of the invention.

FIG. 1 shows a disk-based storage device 100 in accordance with an illustrative embodiment of the invention. The storage device 100 in this embodiment more specifically comprises an HDD that includes a storage disk 110. The storage disk 110 has a storage surface coated with one or more magnetic materials that are capable of storing data bits in the form of respective groups of media grains oriented in a common magnetization direction (e.g., up or down). The storage disk 110 is connected to a spindle 120. The spindle 120 is driven by a spindle motor, not explicitly shown in the figure, in order to spin the storage disk 110 at high speed.

Data is read from and written to the storage disk 110 via a read/write head 130 that is mounted on a positioning arm 140. It is to be appreciated that the head 130 is shown only generally in FIG. 1. The position of the read/write head 130 over the magnetic surface of the storage disk 110 is controlled by an electromagnetic actuator 150. The electromagnetic actuator 150 and its associated driver circuitry in the present embodiment may be viewed as comprising a portion of what is more generally referred to herein as "control circuitry" of the storage device 100. Such control circuitry in this embodiment is assumed to further include additional electronics components arranged on an opposite side of the assembly and therefore not visible in the perspective view of FIG. 1.

The term "control circuitry" as used herein is therefore intended to be broadly construed so as to encompass, by way of example and without limitation, drive electronics, signal processing electronics, and associated processing and memory circuitry, and may encompass additional or alternative elements utilized to control positioning of a read/write head relative to a storage surface of a storage disk in a storage device. A connector 160 is used to connect the storage device 100 to a host computer or other related processing device.

It is to be appreciated that, although FIG. 1 shows an embodiment of the invention with only one instance of each of the single storage disk 110, read/write head 130, and positioning arm 140, this is by way of illustrative example only, and alternative embodiments of the invention may comprise multiple instances of one or more of these or other drive components. For example, one such alternative embodiment may comprise multiple storage disks attached to the same spindle so all such disks rotate at the same speed, and multiple read/write heads and associated positioning arms coupled to one or more actuators.

A given read/write head as that term is broadly used herein may be implemented in the form of a combination of separate read and write heads. More particularly, the term "read/write" as used herein is intended to be construed broadly as read and/or write, such that a read/write head may comprise a read head only, a write head only, a single head used for both reading and writing, or a combination of separate read and write heads. A given read/write head such as read/write head 130 may therefore include both a read head and a write head. Such heads may comprise, for example, write heads with wrap-around or side-shielded main poles, or any other types of heads suitable for recording and/or reading data on a storage disk. Read/write head 130 when performing write operations may be referred to herein as simply a write head.

Also, the storage device 100 as illustrated in FIG. 1 may include other elements in addition to or in place of those specifically shown, including one or more elements of a type commonly found in a conventional implementation of such a storage device. These and other conventional elements, being well understood by those skilled in the art, are not described in detail herein. It should also be understood that the particular arrangement of elements shown in FIG. 1 is presented by way of illustrative example only. Those skilled in the art will recognize that a wide variety of other storage device configurations may be used in implementing embodiments of the invention.

Figure 2:
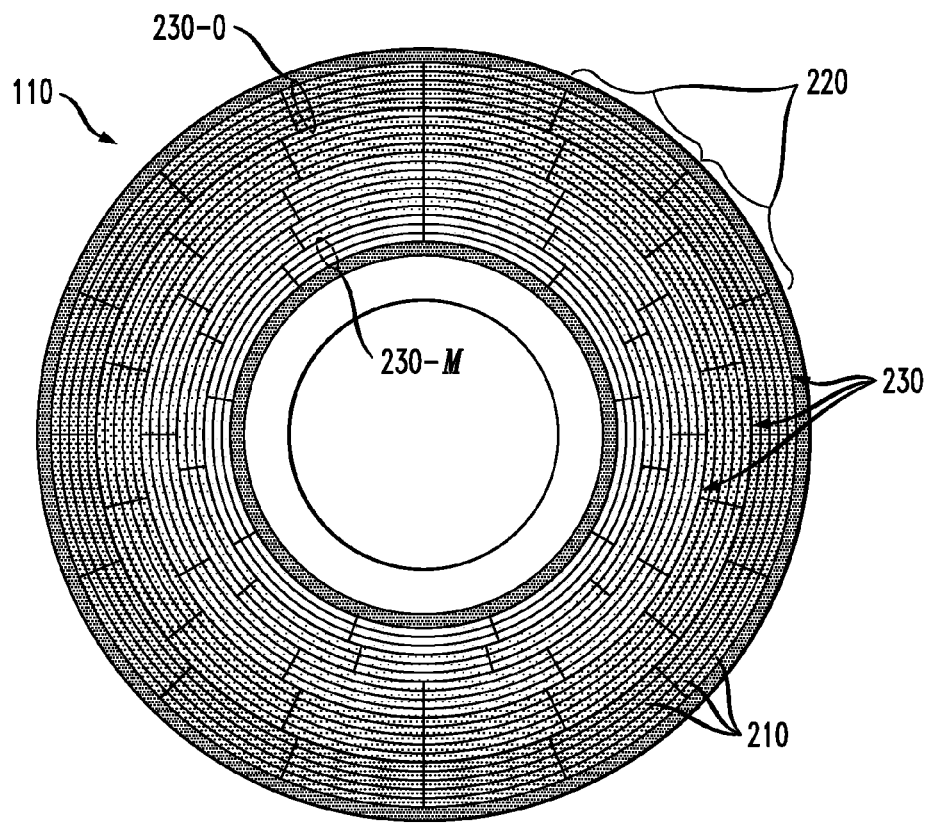
FIG. 2 shows a plan view of a storage disk in the storage device of FIG. 1.

FIG. 2 shows the storage surface of the storage disk 110 in greater detail. As illustrated, the storage surface of storage disk 110 comprises a plurality of concentric tracks 210. Each track is subdivided into a plurality of sectors 220 which are capable of storing a block of data for subsequent retrieval. The tracks located toward the outside edge of the storage disk have a larger circumference when compared to those located toward the center of the storage disk. The tracks are grouped into several annular zones 230, where the tracks within a given one of the zones have the same number of sectors. Those tracks in the outer zones have more sectors than those located in the inner zones. In this example, it is assumed that the storage disk 110 comprises M+1 zones, including an outermost zone 230-0 and an innermost zone 230-M.

The outer zones of the storage disk 110 provide a higher data transfer rate than the inner zones. This is in part due to the fact that the storage disk in the present embodiment, once accelerated to rotate at operational speed, spins at a constant angular or radial speed regardless of the positioning of the read/write head, but the tracks of the inner zones have smaller circumference than those of the outer zones. Thus, when the read/write head is positioned over one of the tracks of an outer zone, it covers a greater linear distance along the disk surface for a given 360° turn of the storage disk than when it is positioned over one of the tracks of an inner zone. Such an arrangement is referred to as having constant angular velocity (CAV), since each 360° turn of the storage disk takes the same amount of time, although it should be understood that CAV operation is not a requirement of embodiments of the invention.

Data bit density is generally constant across the entire storage surface of the storage disk 110, which results in higher data transfer rates at the outer zones. Accordingly, the outermost annular zone 230-0 of the storage disk has a higher average data transfer rate than the innermost annular zone 230-M of the storage disk. The average data transfer rates may differ between the innermost and outermost annular zones in a given embodiment by more than a factor of two. As one example embodiment, provided by way of illustration only, the outermost annular zone may have a data transfer rate of approximately 2.3 Gigabits per second (Gb/s), while the innermost annular zone has a data transfer rate of approximately 1.0 Gb/s. In such an implementation, the HDD may more particularly have a total storage capacity of 500 GB and a spindle speed of 7200 RPM, with the data transfer rates ranging, as noted above, from about 2.3 Gb/s for the outermost zone to about 1.0 Gb/s for the innermost zone.

The storage disk 110 may be assumed to include a timing pattern formed on its storage surface. Such a timing pattern may comprise one or more sets of servo address marks (SAMs) or other types of servo marks formed in particular sectors in a conventional manner. SAMs may therefore be viewed as an example of what are more specifically referred to herein as servo marks.

The particular data transfer rates and other features referred to in the embodiment described above are presented for purposes of illustration only, and should not be construed as limiting in any way. A wide variety of other data transfer rates and storage disk configurations may be used in other embodiments.

Embodiments of the invention will be described below in conjunction with FIGS. 3 to 8, in which the storage device 100 of FIG. 1 is configured to implement at least one write driver having associated degauss circuitry. The degauss circuitry is configured to control a degauss signal waveform to be applied to the write head by the write driver, and comprises separate amplitude envelope control mechanisms for steady state and overshoot portions of the degauss signal waveform. More particularly, in these embodiments, the separate amplitude envelope control mechanisms are configured to provide the steady state and overshoot portions of the degauss signal waveform with different amplitude envelope shapes over a plurality of pulses of that waveform. In such an arrangement, for example, an amplitude envelope decay rate of the overshoot portion of the degauss signal waveform may be different than an amplitude envelope decay rate of the steady state portion of the degauss signal waveform over the plurality of pulses.

FIG. 3 shows a portion of the storage device 100 of FIG. 1 in greater detail. In this view, the storage device 100 comprises a processor 300, a memory 302 and a system-on-a-chip (SOC) 304, which communicate over a bus 306. The storage device further comprises a preamplifier 308 providing an interface between the SOC 304 and the read/write head 130. The memory 302 is an external memory relative to the SOC 304 and other components of the storage device 100, but is nonetheless internal to that storage device. The SOC 304 in the present embodiment includes read channel circuitry 310 and a disk controller 312, and directs the operation of the read/write head 130 in reading data from and writing data to the storage disk 110.

The bus 306 may comprise, for example, one or more interconnect fabrics. Such fabrics may be implemented in the present embodiment as Advanced eXtensible Interface (AXI) fabrics, described in greater detail in, for example, the Advanced Microcontroller Bus Architecture (AMBA) AXI v2.0 Specification, which is incorporated by reference herein. The bus may also be used to support communications between other system components, such as between the SOC 304 and the preamplifier 308. It should be understood that AXI interconnects are not required, and that a wide variety of other types of bus configurations may be used in embodiments of the invention.

The processor 300, memory 302, SOC 304 and preamplifier 308 may be viewed as collectively comprising one possible example of "control circuitry" as that term is utilized herein. Numerous alternative arrangements of control circuitry may be used in other embodiments, and such arrangements may include only a subset of the components 300, 302, 304 and 308, or portions of one or more of these components. For example, the SOC 304 itself may be viewed as an example of "control circuitry." The control circuitry of the storage device 100 in the embodiment as shown in FIG. 3 is generally configured to process data received from and supplied to the read/write head 130 and to control positioning of the read/write head 130 relative to the storage disk 110.

It should be noted that certain operations of the SOC 304 in the storage device 100 of FIG. 3 may be directed by processor 300, which executes code stored in external memory 302. For example, the processor 300 may be configured to execute code stored in the memory 302 for performing at least a portion of a degaussing process carried out by the SOC 304.

Thus, at least a portion of the transition control functionality of the storage device 100 may be implemented at least in part in the form of software code.

The external memory 302 may comprise electronic memory such as random access memory (RAM) or read-only memory (ROM), in any combination. In the present embodiment, it is assumed without limitation that the external memory 302 is implemented at least in part as a double data rate (DDR) synchronous dynamic RAM (SDRAM), although a wide variety of other types of memory may be used in other embodiments. The memory 302 is an example of what is more generally referred to herein as a "computer-readable storage medium." Such a medium may also be writable.

Although the SOC 304 in the present embodiment is assumed to be implemented on a single integrated circuit, that integrated circuit may further comprise portions of the processor 300, memory 302, bus 306 and preamplifier 308. Alternatively, portions of the processor 300, memory 302, bus 306 and preamplifier 308 may be implemented at least in part in the form of one or more additional integrated circuits, such as otherwise conventional integrated circuits designed for use in an HDD and suitably modified to implement degauss circuitry with separate amplitude envelope control mechanisms for steady state and overshoot portions of a degauss signal waveform as disclosed herein.

An example of an SOC integrated circuit that may be modified for use in embodiments of the invention is disclosed in U.S. Pat. No. 7,872,825, entitled "Data Storage Drive with Reduced Power Consumption," which is commonly assigned herewith and incorporated by reference herein.

Other types of integrated circuits that may be used to implement processor, memory or other storage device components of a given embodiment include, for example, a microprocessor, digital signal processor (DSP), application-specific integrated circuit (ASIC), field-programmable gate array (FPGA) or other integrated circuit device.

In an embodiment comprising an integrated circuit implementation, multiple integrated circuit dies may be formed in a repeated pattern on a surface of a wafer. Each such die may include a device as described herein, and may include other structures or circuits. The dies are cut or diced from the wafer, then packaged as integrated circuits. One skilled in the art would know how to dice wafers and package dies to produce packaged integrated circuits. Integrated circuits so manufactured are considered embodiments of the invention.

Although shown as part of the storage device 100 in the present embodiment, one or both of the processor 300 and memory 302 may be implemented at least in part within an associated processing device, such as a host computer or server in which the storage device is installed. Accordingly, elements 300 and 302 in the FIG. 3 embodiment may be viewed as being separate from the storage device 100, or as representing composite elements each including separate processing or memory circuitry components from both the storage device and its associated processing device. As noted above, at least portions of the processor 300 and memory 302 may be viewed as comprising "control circuitry" as that term is broadly defined herein.

Referring now more particularly to the preamplifier 308 of the storage device 100, the preamplifier in this embodiment comprises degauss circuitry 320 and associated write drivers 322. The degauss circuitry 320 comprises separate steady state control 324 and overshoot control 326 for respective steady state and overshoot portions of the degauss signal waveform over a plurality of pulses of that waveform. The degauss circuitry 320 is configured to control a degauss signal waveform to be applied to the write head by one or more of the write drivers 322. The controls 324 and 326 comprise separate amplitude envelope control mechanisms for steady state and overshoot portions of the degauss signal waveform over the plurality of pulses of that waveform. As noted above, in these embodiments, the separate amplitude envelope control mechanisms are more particularly configured to provide the steady state and overshoot portions of the degauss signal waveform with different amplitude envelope shapes over the plurality of pulses of that waveform.

A given write driver 322 in the present embodiment may comprise multiple distinct data paths, such as a high side data path and a low side data path, although different numbers of data paths may be used in other embodiments. It should be noted in this regard that the term "data path" as used herein is intended to be broadly construed, so as to encompass, for example, CMOS circuitry or other types of circuitry through which a data signal passes in preamplifier 308 or another storage device component.

Also, the term "write driver" is intended to encompass any type of driver circuitry that may be used to deliver or otherwise provide one or more degauss signals to the write head of the storage device 100. By way of example, a given one of the write drivers 322 may comprise an X side and a Y side, each comprising both high side and low side drivers, where the X and Y sides are driven on opposite write cycles. Numerous alternative arrangements of circuitry are possible in other write driver embodiments.

Although illustratively shown in FIG. 3 as being separate from the write drivers 322, the degauss circuitry 320 may alternatively be implemented at least in part internally to the write drivers 322.

Figure 4A:
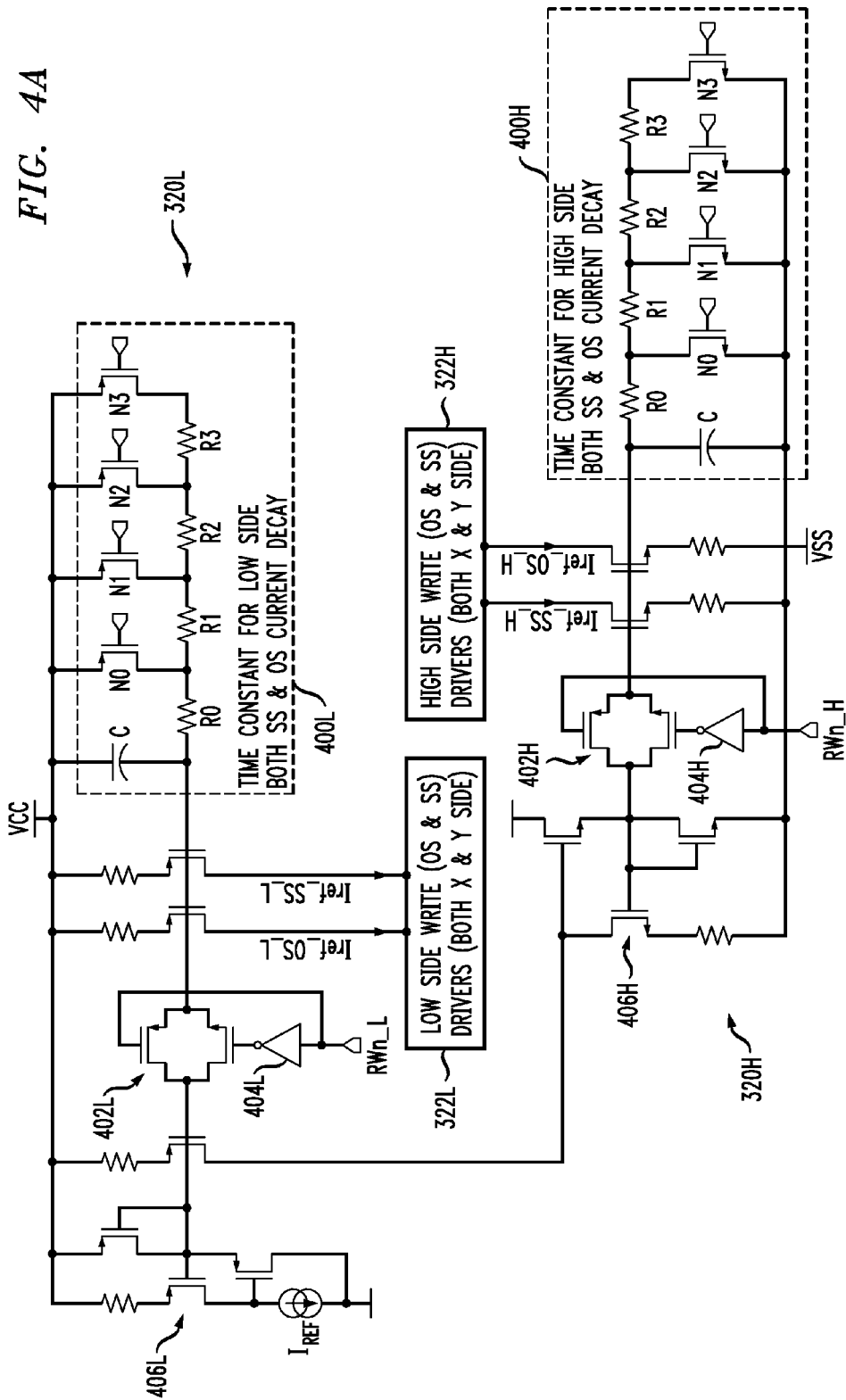
FIG. 4A shows an embodiment of the degauss circuitry and write drivers of FIG. 3 without separate control of amplitude envelopes of respective steady state and overshoot portions of a degauss signal waveform.

Referring initially to FIG. 4A, an embodiment of the degauss circuitry 320 and write drivers 322 is shown without separate control of amplitude envelopes of respective steady state and overshoot portions of a degauss signal waveform. In this embodiment, the degauss circuitry includes high side degauss circuitry 320H which is coupled to high side write drivers 322H for both X and Y sides, and low side degauss circuitry 320L which is coupled to low side write drivers 322L for both X and Y sides. The high and low side degauss control circuitry in this embodiment each include a single common control mechanism 400H or 400L for controlling the amplitude envelopes of both the steady state (SS) and overshoot (OS) portions of a degauss signal waveform.

The FIG. 4A embodiment includes a current source $I_{REF}$, high side and low side T-gate switches 402H and 402L and associated inverters 404H and 404L, and high side and low side master current circuitry 406H and 406L. The upper and lower supply voltages are denoted VCC and VSS, respectively. Each of the T-gate switches comprises a parallel combination of an NMOS device and a PMOS device, with the gate of the NMOS device being driven by an output of the corresponding inverter and the gate of the PMOS device being driven by an input of the inverter. The inverters 404H and 404L receive respective input signals RWn_H and RWn_L as indicated. At the start of a read mode or a degauss mode, RWn_H and RWn_L are set to a logic high level, which turns off the respective T-gate switches 402H and 402L, thereby isolating the respective master current circuitry 406H or 406L from respective steady state and overshoot slave current mirrors associated with drivers 322H and 322L. The high side and low side degauss signal then decays in accordance with time constants set by respective decay rate control modules 400H and 400L.

Figure 5A:
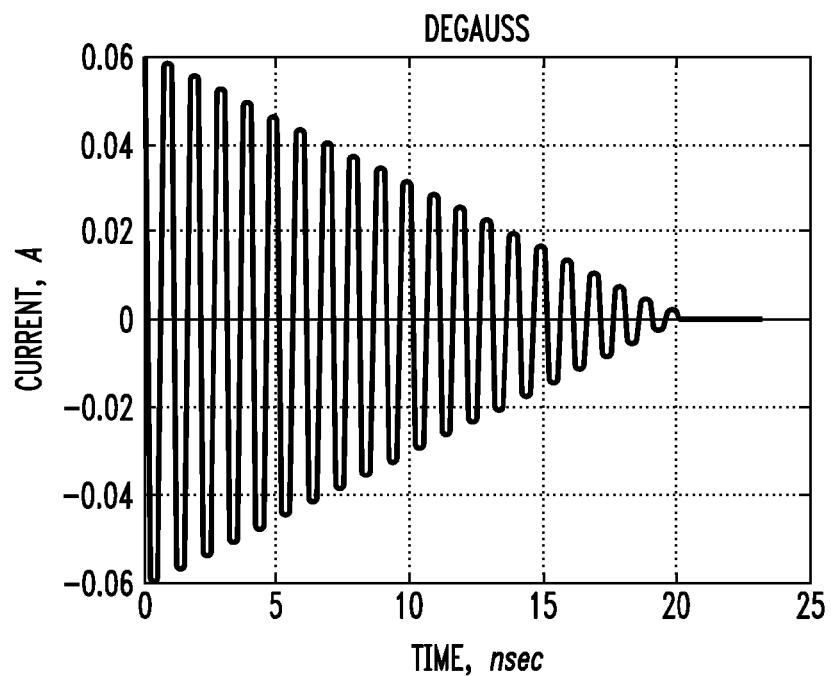
FIG. 5A shows an example of a degauss signal waveform comprising a plurality of pulses of decaying amplitude without overshoot.
Figure 5B:
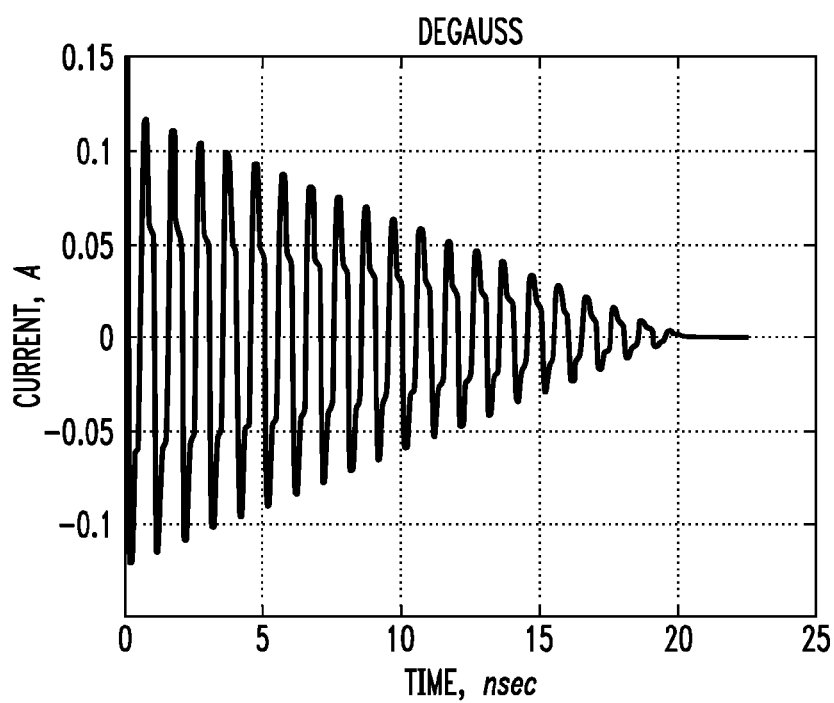
FIG. 5B shows an example of a degauss signal waveform comprising a plurality of pulses of decaying amplitude with overshoot, where amplitude envelopes of steady state current and overshoot current decay at substantially the same rate over the pulses.

As noted above, a typical degauss signal waveform includes current pulses that repeat at a fixed frequency and decay in steady state amplitude over time. The waveform may include overshoot on each pulse, but in this case the steady state and overshoot portions of the waveform decay at substantially the same rate. An example of a degauss signal waveform without overshoot is shown in FIG. 5A, and an example of a degauss signal waveform with overshoot is shown in FIG. 5B. Each degauss signal waveform in these examples comprises a sequence of pulses of decaying amplitude. The degauss signal pulse current in amperes (A) is plotted as a function of time in nanoseconds (ns).

The embodiment of FIG. 4A produces a degauss signal waveform of the type shown in FIG. 5B, where the steady state and overshoot portions of the waveform decay at substantially the same rate. This is because the steady state and overshoot portions of a given high side or low side degauss signal waveform are both controlled using the same control mechanism, namely the decay rate control module 400H or 400L. This control module 400H or 400L provides a selectable decay rate time constant established by capacitor C in combination with one or more selected resistors R0, R1, R2 and R3, depending on the logic levels of respective control bits applied to the gate terminals of n-type metal-oxide-semiconductor (NMOS) transistors N0, N1, N2 and N3.

The four control bits in this embodiment are denoted as degauss duration bits DegaussDur<3:0>, and are applied to respective gate terminals of the transistors N0 through N3. By appropriate selection of the logic states of these control bits, the decay rate time constant for the degauss waveform pulses of FIG. 5B can be adjusted. However, as noted above, different decay rate time constants cannot be set for the steady state and overshoot portions of the degauss signal waveform in this embodiment, and so the steady state and overshoot portions of the waveform decay at substantially the same rate.

Figure 4B:
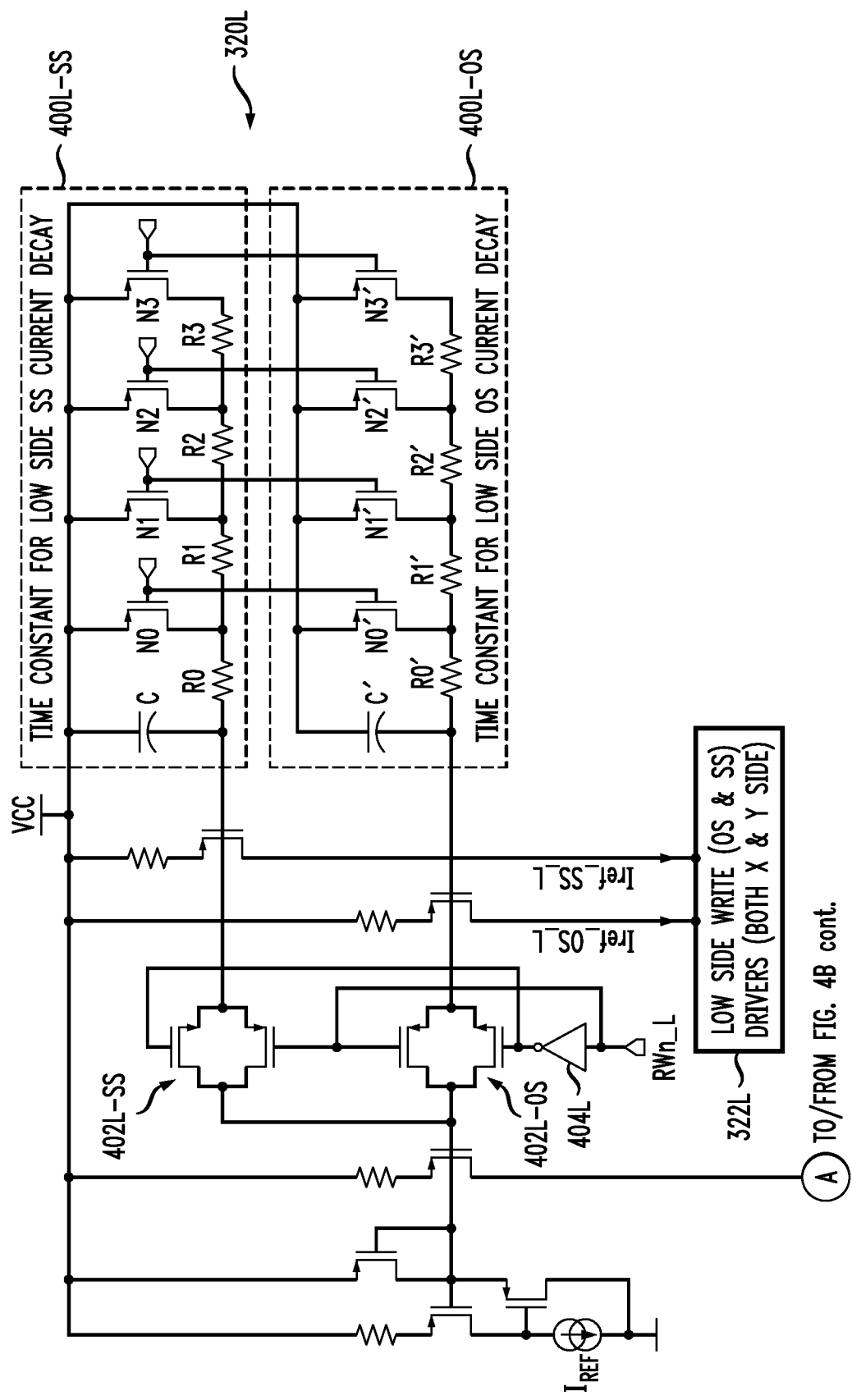
FIG. 4B shows an embodiment of the degauss circuitry and write drivers of FIG. 3 with separate control of amplitude envelopes of respective steady state and overshoot portions of a degauss signal waveform.
Figure 4B:
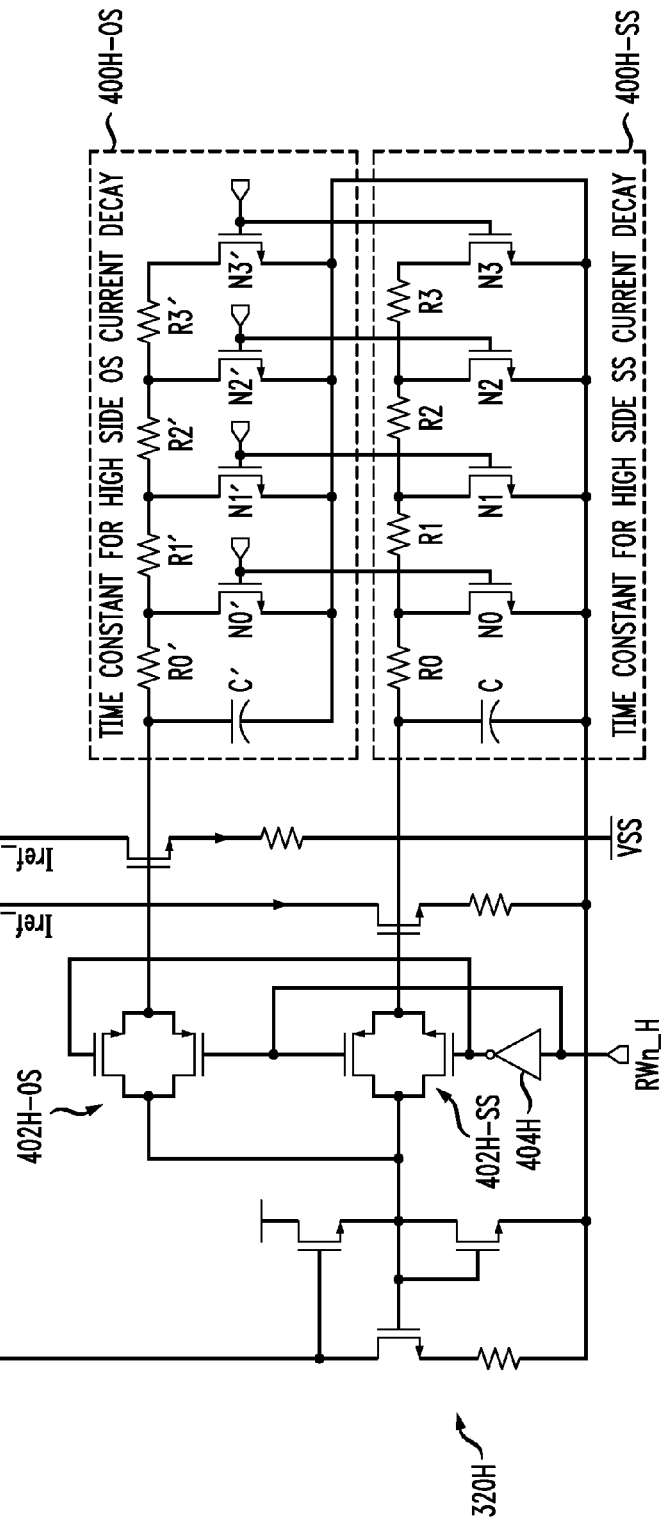

FIG. 4B shows an embodiment of the degauss circuitry 320 and write drivers 322 of FIG. 3 with separate control of amplitude envelopes of respective steady state and overshoot portions of a degauss signal waveform. In this embodiment, the amplitude envelope decay rate time constants of the respective steady state and overshoot portions of the degauss signal waveform are separately controlled. More particularly, the high side degauss circuitry 320H includes separate decay rate control modules 400H-SS and 400H-OS for respective steady state and overshoot portions of the high side degauss signal waveform. Similarly, the low side degauss circuitry 320L includes separate decay rate control modules 400L-SS and 400L-OS for respective steady state and overshoot portions of the low side degauss signal waveform.

Also in this embodiment, separate pairs of T-gate switches 402H-SS, 402H-OS and 402L-SS, 402L-OS are used for the respective high side and low side, driven by respective inverters 404H and 404L response to the RWn signals as previously described.

In each of the high side and the low side degauss circuitry 320H and 320L, the steady state decay rate control module 400H-SS or 400L-SS provides a selectable steady state decay rate time constant established by capacitor C in combination with one or more selected resistors R0, R1, R2 and R3, depending on the logic levels of respective control bits applied to the gate terminals of transistors N0, N1, N2 and N3.

Also, in each of the high side and the low side degauss circuitry 320H and 320L, the overshoot decay rate control module 400H-OS or 400L-OS provides a selectable overshoot decay rate time constant established by capacitor C' in combination with one or more selected resistors R0', R1', R2' and R3', depending on the logic levels of respective control bits applied to the gate terminals of transistors N0', N1', N2' and N3'.

The high side and low side decay rate control modules 400H-SS, 400H-OS, 400L-SS and 400L-OS are examples of what are more generally referred to herein as separate control mechanisms of the degauss circuitry 320.

In the FIG. 4B embodiment, the same degauss duration bits DegaussDur<3:0> are applied to respective gate terminals of the transistors N0 through N3 and to respective gate terminals of the transistors N0' through N3'. By appropriate selection of the values of capacitors C and C' and resistors R0-R3 and R0'-R3', different decay rates can be established for the steady state and overshoot portions of the high side and low side degauss signal waveforms. Further adjustments of these different decay rates are provided by appropriate selection of the logic states of the degauss duration bits DegaussDur<3:0>.

Figure 4C:
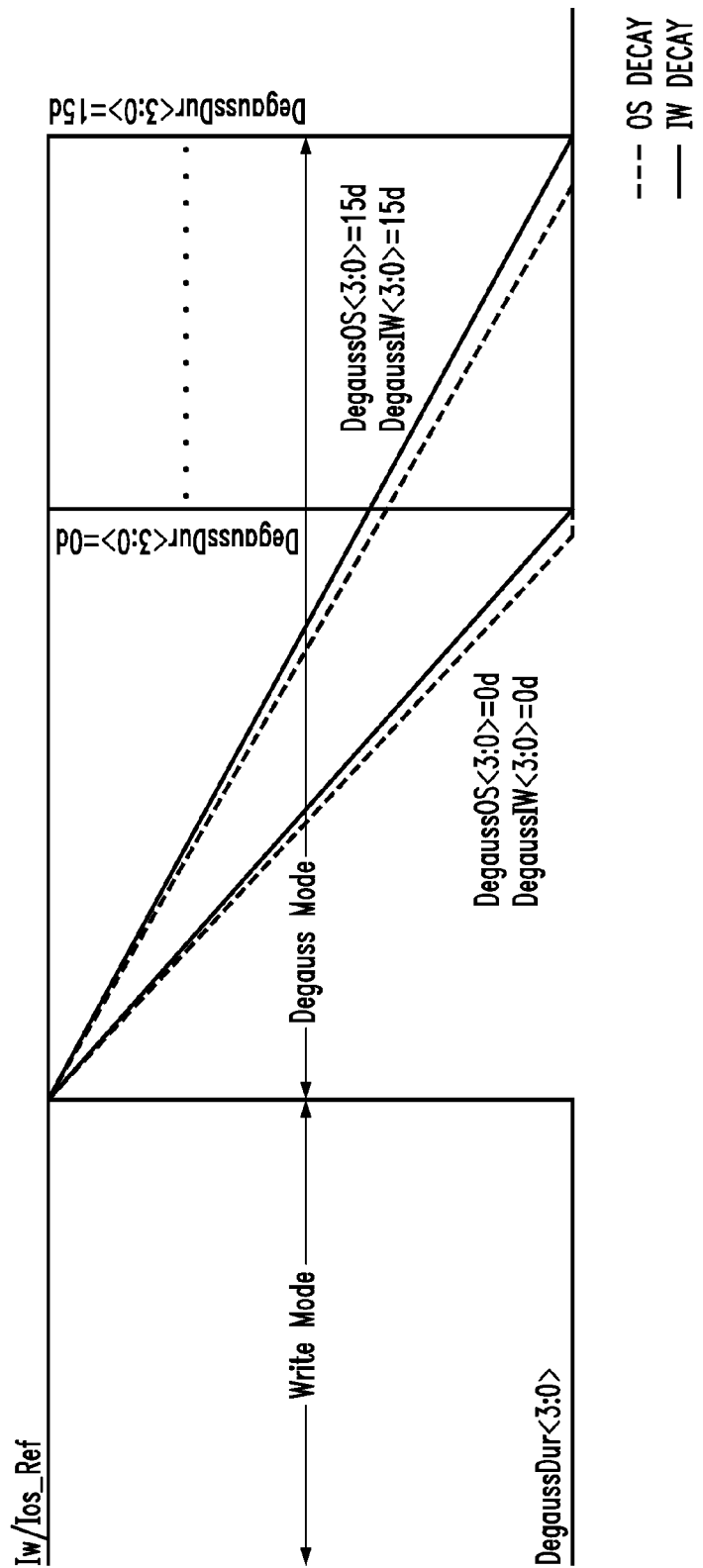
FIGS. 4C and 4D illustrate the operation of different control mechanisms that may be utilized with the embodiment of FIG. 4B.

The decay rate adjustment provided in the FIG. 4B embodiment is illustrated in greater detail in FIG. 4C. The downward-sloping dashed lines in the figure show the minimum and maximum decay rates that can be established for the overshoot portion of the degauss signal waveform by variation of the degauss duration bits DegaussDur<3:0> from 0d=<0000> to 15d=<1111>. The adjacent downward-sloping solid lines in the figure show the minimum and maximum decay rates that can be established for the steady state or IW portion of the degauss signal waveform, also by variation of the degauss duration bits DegaussDur<3:0> from 0d=<0000> to 15d=<1111>.

It can be seen in the figure that there is a differential in the decay rates between the overshoot and steady state portions, regardless of the particular logic levels of the degauss duration bits DegaussDur<3:0>. This decay rate differential is introduced in this embodiment through the use of different values for one or more of capacitor C' and resistors R0'-R3' in the overshoot decay rate control module, relative to those values utilized for one or more of capacitor C and resistors R0-R3 in the steady state decay rate control module.

Figure 5C:
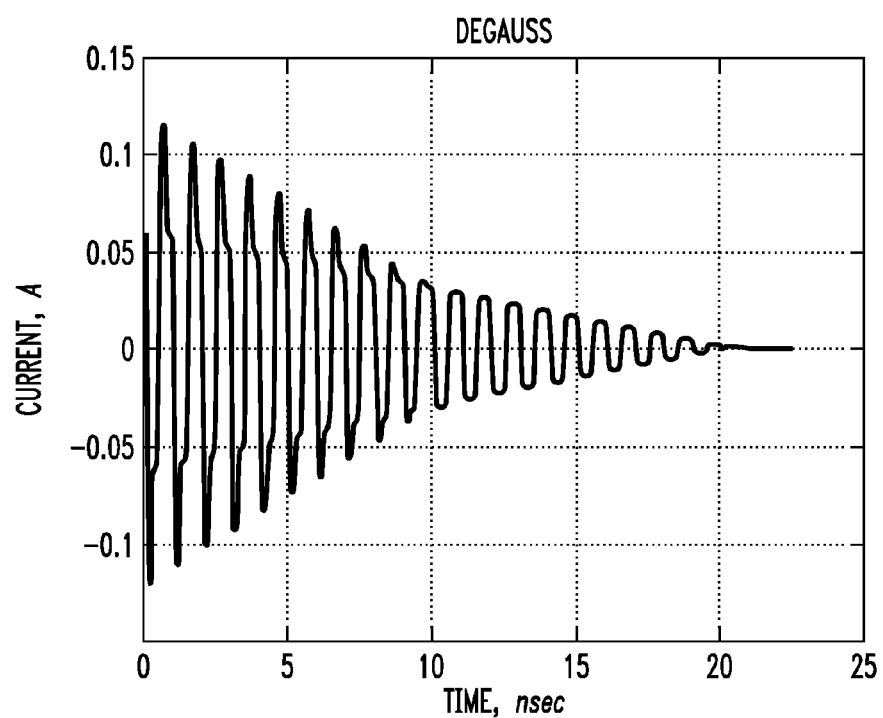
FIG. 5C shows an example of a degauss signal waveform comprising a plurality of pulses of decaying amplitude with overshoot, and with separate control of amplitude envelopes of steady state current and overshoot current over the pulses.

As shown, the decay rate for the overshoot portion of the degauss signal waveform is faster than the decay rate for the steady state portion. Thus, as illustrated in FIG. 5C, the beginning of the degauss signal waveform comprises pulses with overshoot, but the end of the degauss signal waveform comprises pulses without overshoot, because the overshoot portion of the waveform decays faster than the steady state portion. This is in contrast to the degauss signal waveform shown in FIG. 5B, where the overshoot and steady state portions decay at substantially the same rate, such that even the final pulses of the waveform continue to exhibit overshoot.

Figure 4D:
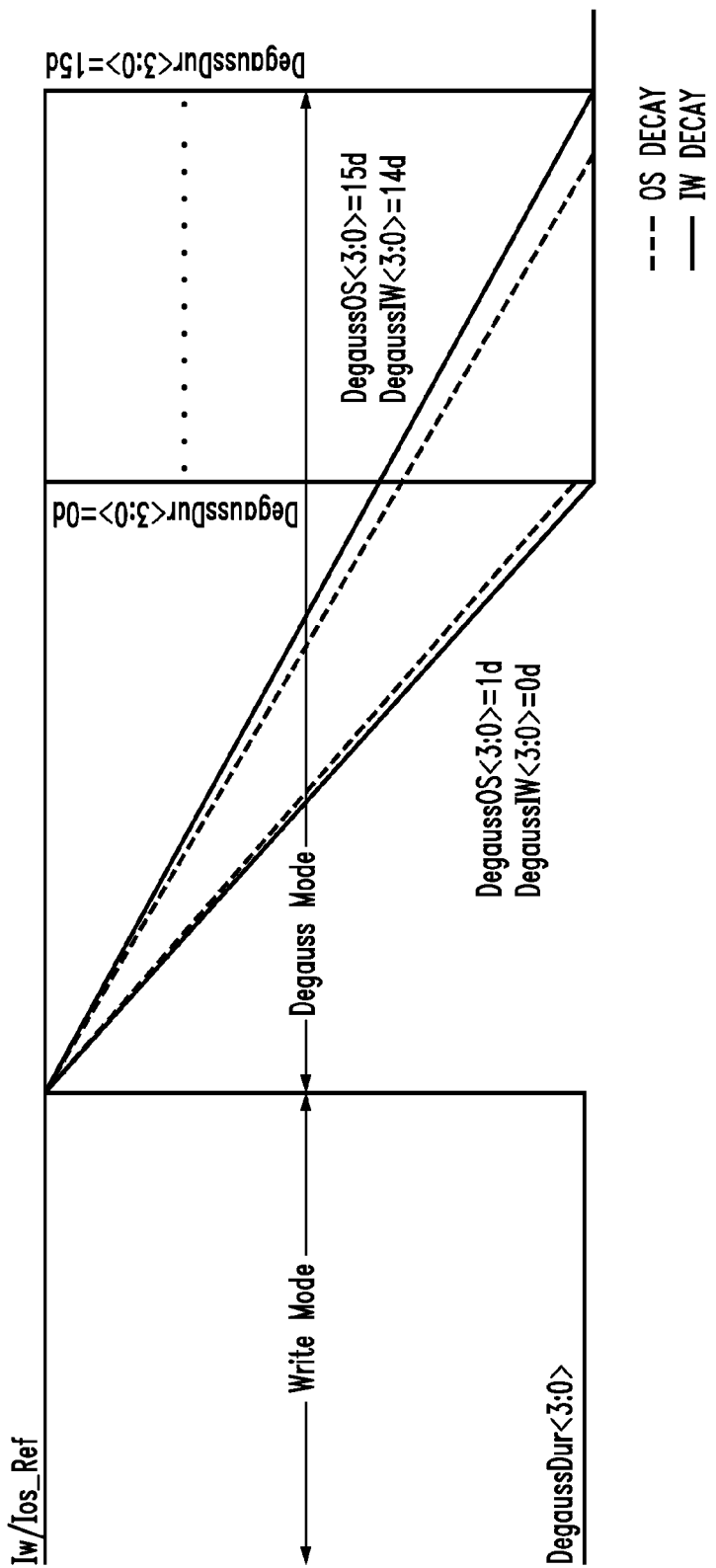

In another embodiment, different sets of decay rate control bits may be used for the steady state transistors N0-N3 and the overshoot transistors N0'-N3'. The decay rate control in such an embodiment is illustrated in FIG. 4D, with the steady state degauss duration bits being denoted DegaussIW<3:0> and the overshoot degauss duration bits being denoted DegaussOS<3:0>. It is assumed in this embodiment that substantially the same values are utilized for capacitors C and C' and the resistors R0-R3 and R0'-R3' in the respective steady state and overshoot decay rate control modules. Differentials between the decay rates of the overshoot and steady state portions are instead introduced by selecting different values for the steady state degauss duration bits DegaussIW<3:0> and the overshoot degauss duration bits DegaussOS<3:0>.

For example, as shown in FIG. 4D, differentials may be introduced between the decay rates of the overshoot and steady state portions, by setting DegaussIW<3:0>=0d=<0000> and DegaussOS<3:0>=1d=<0001>, as indicated by the first set of downwardly-sloping lines, or by setting DegaussIW<3:0>=14d=<1110> and DegaussOS<3:0>=15d=<1111>, as indicated by the second set of downwardly-sloping lines. However, it should be noted that additional digital signals are required in such an arrangement, as well as associated circuitry, such as level shifting circuitry.

Figure 4E:
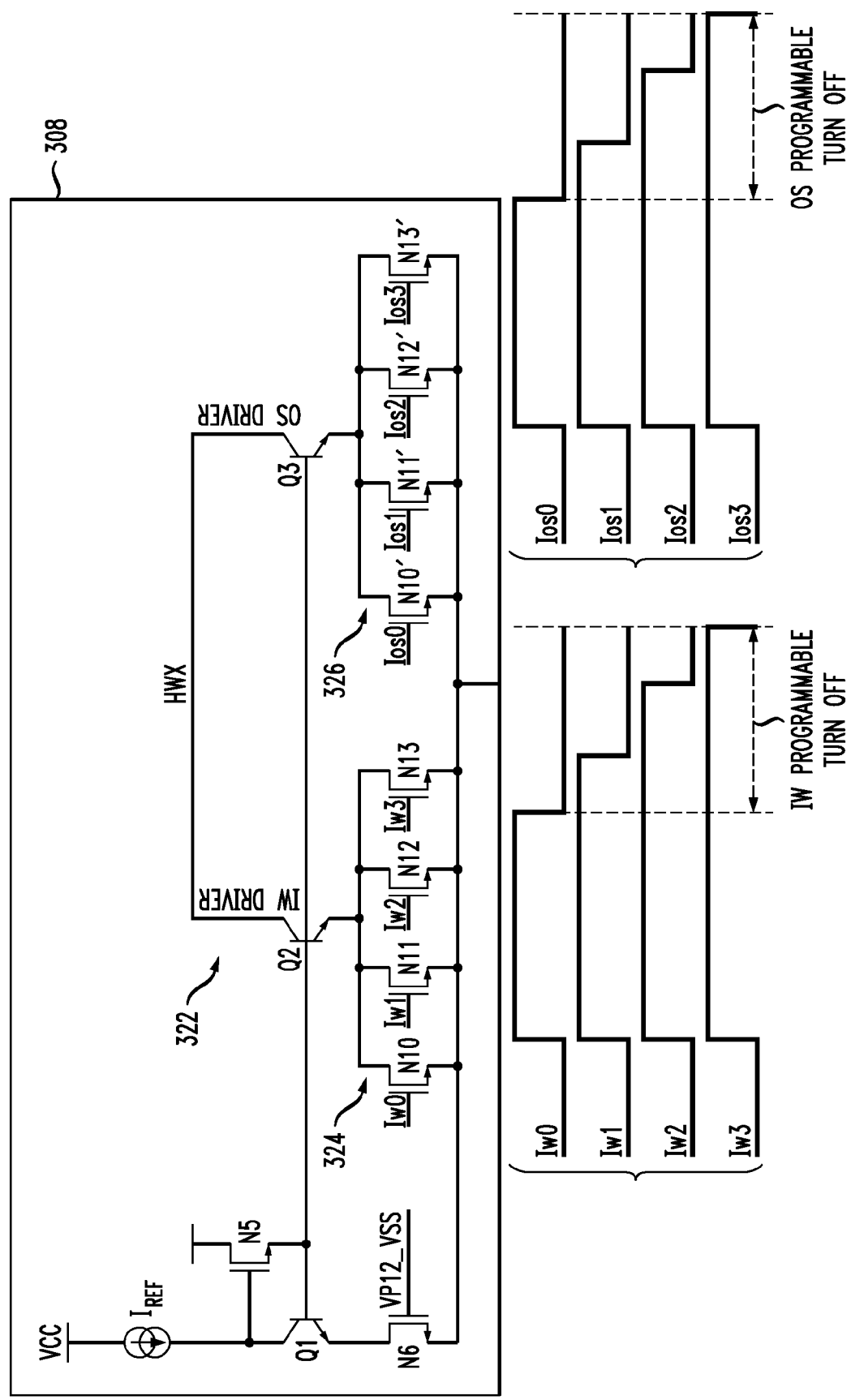
FIG. 4E shows another embodiment of the degauss circuitry and write drivers of FIG. 3 with separate control of amplitude envelopes of steady state and overshoot portions of a degauss signal waveform.

FIG. 4E shows another embodiment of the degauss circuitry 320 and write drivers 322 of FIG. 3 with separate control of amplitude envelopes of steady state and overshoot portions of a degauss signal waveform.

In this embodiment, drive current is provided using reference current source $I_{REF}$, NMOS devices N5 and N6, and n-p-n bipolar transistor Q1. The gate of N5 is coupled to the collector of Q1, and the gate of N6 receives an input signal denoted VP12_VSS. The drain of N6 is coupled to the emitter of Q1 and to the lower terminal of $I_{REF}$. The drain of N5 is coupled to an upper supply voltage, which may be a +Ve supply. The gate of N6 receives a voltage signal that may be given by −Ve+1.5 v, although this particular exemplary voltage value and other voltage values used in a given embodiment may vary depending on factors such as the process technology used.

As shown, a lower half side of a given write driver 322 comprises n-p-n bipolar transistors Q2 and Q3 for respective steady state and overshoot portions of the degauss signal waveform. The collectors of Q2 and Q3 are coupled to an X-side signal pad denoted HWX.

The steady state control 324 comprises NMOS transistors N10-N13 arranged in parallel with one another between an emitter of the steady state bipolar transistor Q2 and a lower supply voltage, which may be a −Ve supply, and the overshoot control 326 comprises NMOS transistors N10'-N13' arranged in parallel with one another between an emitter of the overshoot bipolar transistor Q3 and the lower supply voltage. Separate sets of control signals Iw0-Iw3 and Ios0-Ios3 are applied to the respective gate terminals of the transistors N10-N13 and N10'-N13'. The decay rates of the respective steady state and overshoot portions of the degauss signal waveform are separately controlled through programmable turn-off of the steady state and overshoot portions using the separate sets of control signals Iw0-Iw3 and Ios0-Ios3 as indicated.

Timing diagrams are shown in the figure illustrating one possible turn-off arrangement for each of the steady state and overshoot portions. In this embodiment, the amplitude envelope will exhibit a stepped decay rather than a continuous decay as in the FIG. 4B embodiment. The resolution of the step size is limited because it can be difficult to control multiple high-speed digital signals between high and low side drivers.

The illustrative embodiments provide a number of significant advantages relative to conventional degaussing arrangements. For example, by providing a faster decay rate for the overshoot portion of the degauss signal waveform than for the steady state portion of the degauss signal waveform, an efficient reduction of out-of-plane magnetization is achieved in the write head, particularly at the end of the degauss signal, resulting in improved demagnetization. Also, separate control of steady state and overshoot portions can allow degauss signal duration to be reduced by increasing the frequency of the pulses.

These improvements in one or more embodiments may be due in part to the magnetics of the switching of the write head. A degauss signal with overshoot is important during the first stage of switching to destroy uniform magnetization that remains in a tapered region of a write head at the end of a write operation. As a result of the applied degauss signal, numerous magnetic domains are created and start to propagate to an equilibrium pattern following the amplitude of the degauss signal. Without overshoot these domains will require a much longer time to be created and to properly move within the tapered region. However, a second stage of switching, below a certain level of applied field, does not lead to creation of a new domain, so overshoot is not desirable in this stage. Moreover, overshoot can delay relaxation to the final equilibrium remanent magnetization state, and in some cases magnetic domain pinning or lock up can be observed, leading to EAW. Degauss signal waveforms of the type shown in FIG. 5C address these and other issues, leading to improved performance.

Figure 6:
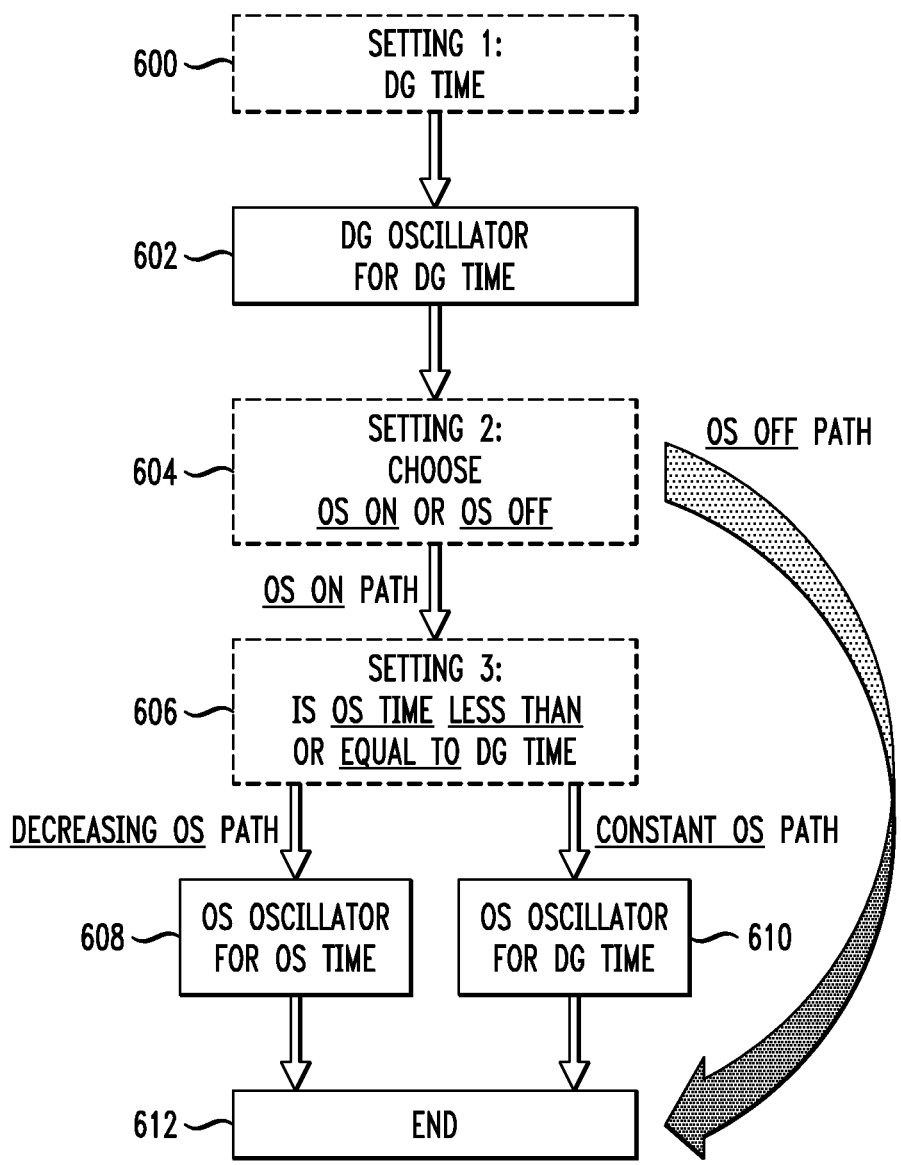
FIG. 6 is a flow diagram of a degaussing process implemented in the FIG. 1 storage device in an illustrative embodiment.

Referring now to FIG. 6, a degaussing process implemented in the FIG. 1 storage device in an illustrative embodiment includes steps 600 through 612 as indicated. After completing a write of a given sector of data, the write head will need to be turned off in many cases. However, if the write head is known or suspected to produce EAW, then the write head is degaussed immediately following a write mode, before it is turned off, in order to prevent remanent magnetization from affecting other portions of the magnetic medium, including data sectors and servo sectors.

In the FIG. 6 process, there are three settings, denoted Setting 1, Setting 2 and Setting 3, associated with respective steps 600, 604 and 606. There are also three different possible paths, including an OS off path which produces a degauss signal waveform of the type shown in FIG. 5A, a constant OS path which produces a degauss signal waveform of the type shown in FIG. 5B, and a decreasing OS path which produces a degauss signal waveform of the type shown in FIG. 5C.

Setting 1 involves the setting of the steady state degauss (DG) time in step 600, which will cause a steady state oscillator of the degauss circuitry 320 to begin to operate for the DG time as indicated in step 602. In step 604, Setting 2 involves choosing whether OS will be on or off. If OS off is selected, the process ends as indicated in step 612. Thus, the process in this case simply involves operating the steady state oscillator for the specified DG time. Otherwise, OS on is selected, and Setting 3 in step 606 is then specified, to indicate whether the OS time will be less than or equal to the DG time. If the OS time will be less than the DG time, the decreasing OS path is taken to step 608, which causes an overshoot oscillator to operate for a specified OS time, which is less than the DG time. If the OS time is selected as equal to the DG time, the constant OS path is taken to step 610, which causes the overshoot oscillator to operate for the DG time.

The various steps shown in FIG. 6 may be performed at least in part in parallel with one another. Thus, the settings referred to in this process may be made substantially simultaneously, prior to generating the appropriate degauss signal based upon those settings. Numerous other degauss processes using additional or alternative steps may be used in other embodiments.

It is to be appreciated that the particular circuitry arrangements, degauss signal waveforms and degauss process operations shown in FIGS. 3-6 are presented by way of example only, and other embodiments of the invention may utilize other types and arrangements of elements for implementing separate control of amplitude envelopes of respective steady state and overshoot portions of a degauss signal waveform as disclosed herein.

For example, the particular amplitude envelopes illustrated in FIG. 5C may be altered in other embodiments. Accordingly, a wide variety of different types of amplitude envelopes may be used for the overshoot portion of the degauss signal waveform, independently of the amplitude envelope selected for the steady state portion of the degauss signal waveform. These may include an overshoot amplitude envelope in which start of the overshoot portion is delayed relative to start of the steady state portion, an overshoot amplitude envelope in which the overshoot portion is held at a constant level for at least a subset of the plurality of pulses, or an overshoot amplitude envelope in which the overshoot portion is subject to a specified type of modulation for at least a subset of the plurality of pulses. The amplitude envelope shapes in these and other cases may be linear, exponential or arbitrary shapes, and may be selected independently of the amplitude envelope shape used for the steady state portion of the degauss signal waveform.

Also, numerous other types of control mechanisms may be used to establish different amplitude envelopes for respective steady state and overshoot portions of a given degauss signal waveform. As indicated above, static amplitude envelope control circuitry may be used, in which the amplitude envelope shapes of the respective steady state and overshoot portions are not dynamically variable during operation of the drive but are instead fixed to particular different shapes by design. The latter static arrangements are considered a type of "control mechanism" as that term is broadly utilized herein.

As mentioned previously, the storage device configuration can be varied in other embodiments of the invention. For example, the storage device may comprise a hybrid HDD which includes a flash memory in addition to one or more storage disks.

It should also be understood that the particular storage disk configuration and recording mechanism can be varied in other embodiments of the invention. For example, a variety of recording techniques including SMR, BPM, HAMR and MAMR can be used in one or more embodiments of the invention.

Figure 7:
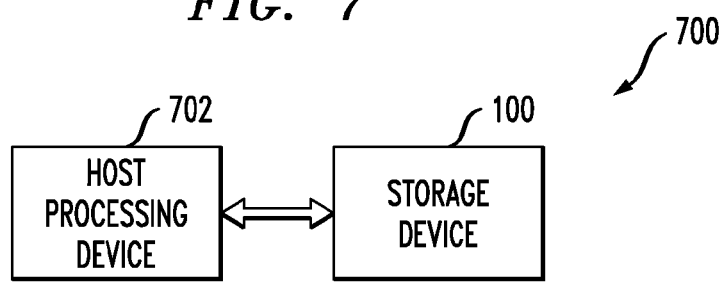
FIG. 7 illustrates interconnection of the storage device of FIG. 1 with a host processing device in a data processing system.

FIG. 7 illustrates a processing system 700 comprising the disk-based storage device 100 coupled to a host processing device 702, which may be a computer, server, communication device, etc. Although shown as a separate element in this figure, the storage device 100 may be incorporated into the host processing device. Instructions such as read commands and write commands directed to the storage device 100 may originate from the processing device 702, which may comprise processor and memory elements similar to those previously described in conjunction with FIG. 3.

Figure 8:
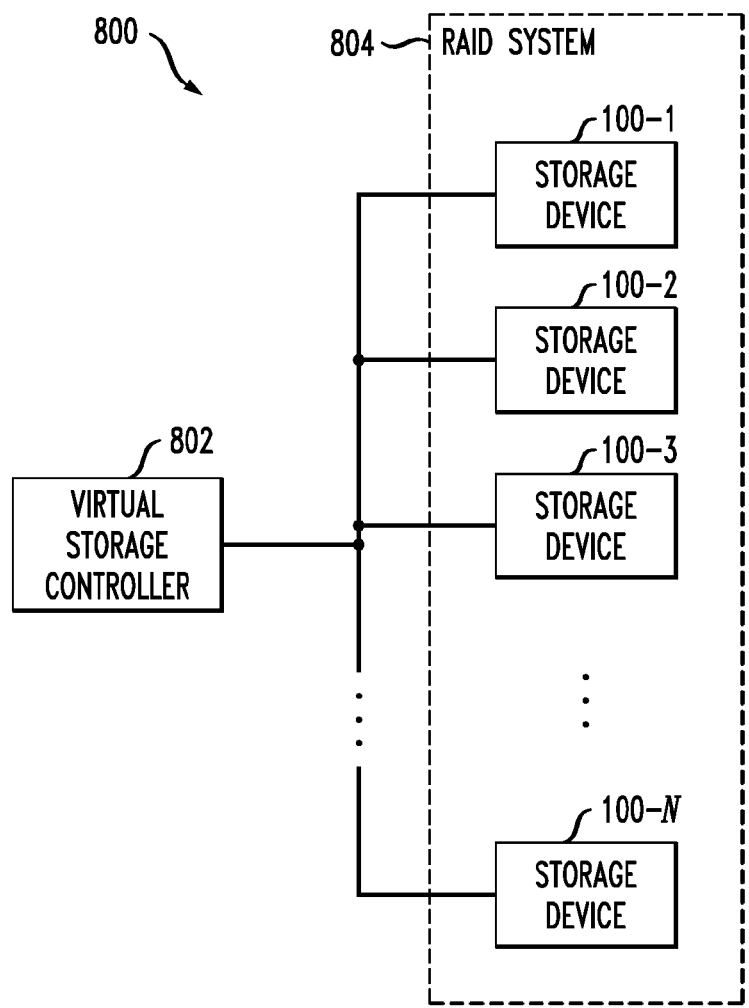
FIG. 8 shows a virtual storage system incorporating a plurality of disk-based storage devices of the type shown in FIG. 1.

Multiple disk-based storage devices 100 may be incorporated into a virtual storage system 800 as illustrated in FIG. 8. The virtual storage system 800, also referred to as a storage virtualization system, illustratively comprises a virtual storage controller 802 coupled to a RAID system 804, where RAID denotes Redundant Array of Independent Disks. The RAID system more specifically comprises N distinct storage devices denoted 100-1, 100-2, . . . 100-N, one or more of which are assumed to be configured to include degauss circuitry with separate control mechanisms for respective steady state and overshoot portions of a degauss signal waveform as disclosed herein. These and other virtual storage systems comprising HDDs or other disk-based storage devices of the type disclosed herein are considered embodiments of the invention. The host processing device 702 in FIG. 7 may also be an element of a virtual storage system, and may incorporate the virtual storage controller 802.

Again, it should be emphasized that the above-described embodiments of the invention are intended to be illustrative only. For example, other embodiments can use different types and arrangements of storage disks, write heads, control circuitry, preamplifiers, write drivers, degauss circuitry and other storage device elements for implementing the described amplitude envelope control functionality. Also, the particular manner in which steady state and overshoot portions of a given degauss signal waveform are separately controlled so as to include distinct amplitude envelopes over a plurality of pulses may be varied in other embodiments. These and numerous other alternative embodiments within the scope of the following claims will be apparent to those skilled in the art.

What is claimed is:

1. An apparatus comprising:
   control circuitry adapted for coupling to a write head configured to write data to a storage disk, the control circuitry being configured to process data supplied to the write head;
   wherein the control circuitry comprises:
   a write driver; and
   degauss circuitry associated with the write driver and configured to control a degauss signal waveform to be applied to the write head by the write driver;
   wherein the degauss circuitry comprises separate amplitude envelope control mechanisms for steady state and overshoot portions of the degauss signal waveform.

2. The apparatus of claim 1 wherein the separate amplitude envelope control mechanisms are configured to provide the steady state and overshoot portions of the degauss signal waveform with different amplitude envelope shapes over a plurality of pulses of said waveform.

3. The apparatus of claim 2 wherein an amplitude envelope decay rate of the overshoot portion of the degauss signal waveform is different than an amplitude envelope decay rate of the steady state portion of the degauss signal waveform over the plurality of pulses.

4. The apparatus of claim 1 wherein the amplitude envelope control mechanism for the overshoot portion of the degauss signal waveform is configured to provide at least one of the following overshoot amplitude envelopes for the overshoot portion of the degauss signal waveform over the plurality of pulses:
   a first overshoot amplitude envelope in which start of the overshoot portion is delayed relative to start of the steady state portion;
   a second amplitude envelope in the overshoot portion is held at a constant level for at least a subset of the plurality of pulses; and
   a third amplitude envelope in which the overshoot portion is subject to specified type of modulation for at least a subset of the plurality of pulses.

5. The apparatus of claim 1 wherein the amplitude envelope control mechanisms comprise respective steady state and overshoot controllers for controlling the amplitude envelopes of the respective steady state and overshoot portions of the degauss signal waveform over a plurality of pulses of the degauss signal waveform.

6. The apparatus of claim 5 wherein the separate steady state and overshoot controllers of the degauss circuitry comprise:
   a first decay rate control module configured to provide a first amplitude envelope decay rate for steady state current of the plurality of pulses of the degauss signal waveform; and
   a second decay rate control module configured to provide a second amplitude envelope decay rate for overshoot current of the plurality of pulses of the degauss signal waveform;
   wherein the first amplitude envelope decay rate is different than the second amplitude envelope decay rate.

7. The apparatus of claim 5 wherein the separate steady state and overshoot controllers of the degauss circuitry are independently controllable responsive to respective control signals in a manner that allows one or more different amplitude envelope characteristics to be established for amplitude envelopes of steady state and overshoot currents of the degauss signal waveform over the plurality of pulses.

8. The apparatus of claim 7 wherein the control signals are configured such that the amplitude envelope decay rate time constant for the steady state current of the plurality of pulses of the degauss signal waveform is different than the amplitude envelope decay rate time constant for the overshoot current of the plurality of pulses of the degauss signal waveform.

9. The apparatus of claim 8 wherein the control signals comprise respective multi-bit control signals with each bit controlling insertion or removal of a time constant control element of the corresponding controller based on its logic level.

10. The apparatus of claim 1 wherein the degauss circuitry is at least partially incorporated into the write driver.

11. The apparatus of claim 1 wherein the write driver comprises separate high side and low side write drivers, and the degauss circuitry is configured to generate high side and low side degauss signals for the respective high side and low side drivers, with each such degauss signal having a waveform with steady state and overshoot portions that have different amplitude envelopes over a plurality of pulses of the waveform.

12. The apparatus of claim 1 wherein the control circuitry is fabricated in at least one integrated circuit.

13. A storage device comprising the apparatus of claim 1.

14. A virtual storage system comprising the storage device of claim 13.

15. The apparatus of claim 1 wherein the control circuitry further comprises:
at least one integrated circuit comprising a disk controller and read channel circuitry; and
a preamplifier coupled between said at least one integrated circuit and the write head;
wherein the write driver and its associated degauss circuitry are implemented in the preamplifier.

16. The apparatus of claim 1 comprising a processor and a memory coupled to the processor, wherein at least a portion of the control circuitry is implemented by the processor executing software code stored in the memory.

17. A method comprising the steps of:
writing data to a storage disk via a write head of a storage device;
generating a degauss signal having a waveform in which steady state and overshoot portions have respective amplitude envelopes that are separately controlled over a plurality of pulses of said waveform; and
applying the degauss signal to the write head of the storage device.

18. The method of claim 17 wherein the generating step comprises:
providing a first amplitude envelope decay rate for steady state current of the plurality of pulses of the degauss signal waveform; and
providing a second amplitude envelope decay rate for overshoot current of the plurality of pulses of the degauss signal waveform;
wherein the first amplitude envelope decay rate is different than the second amplitude envelope decay rate.

19. A non-transitory computer-readable storage medium having embodied therein executable code for performing the steps of the method of claim 17.

20. A processing system comprising:
a processing device; and
a storage device coupled to the processing device and comprising at least one storage disk;
wherein the storage device further comprises:
a write head configured to write data to the storage disk; and
control circuitry coupled to the write head and configured to process data supplied to the write head;
the control circuitry comprising:
a write driver; and
degauss circuitry associated with the write driver and configured to control a degauss signal waveform to be applied to the write head by the write driver;
wherein the degauss circuitry comprises separate amplitude envelope control mechanisms for steady state and overshoot portions of the degauss signal waveform.

* * * * *